United States Patent
Bui-Van et al.

(10) Patent No.: US 12,345,809 B2
(45) Date of Patent: Jul. 1, 2025

(54) VEHICULAR RADAR SENSOR WITH ANTENNA THAT PROVIDES IMPROVED BLIND-SPOT DETECTION

(71) Applicant: Magna Electronics Inc., Auburn Hills, MI (US)

(72) Inventors: Ha Bui-Van, Aschaffenburg (DE); Wilhelm Johann Wolfgang Wöhlte, Sailauf (DE)

(73) Assignee: Magna Electronics Inc., Auburn Hills, MI (US)

( * ) Notice: Subject to any disclaimer, the term of this patent is extended or adjusted under 35 U.S.C. 154(b) by 280 days.

(21) Appl. No.: 18/303,202

(22) Filed: Apr. 19, 2023

(65) Prior Publication Data

US 2024/0118414 A1 Apr. 11, 2024

Related U.S. Application Data

(60) Provisional application No. 63/363,250, filed on Apr. 20, 2022.

(51) Int. Cl.
*G01S 13/931* (2020.01)
*G01S 7/41* (2006.01)
*G01S 13/04* (2006.01)

(52) U.S. Cl.
CPC .............. *G01S 13/931* (2013.01); *G01S 7/41* (2013.01); *G01S 13/04* (2013.01); *G01S 2013/93271* (2020.01); *G01S 2013/93275* (2020.01)

(58) Field of Classification Search
USPC ................................................. 343/711–718
See application file for complete search history.

(56) References Cited

U.S. PATENT DOCUMENTS

| | | | | | |
|---|---|---|---|---|---|
| 5,999,092 | A * | 12/1999 | Smith | ................... | G01S 13/931 340/436 |
| 6,587,186 | B2 * | 7/2003 | Bamji | ..................... | G01S 7/491 356/5.1 |
| 6,674,895 | B2 * | 1/2004 | Rafii | ....................... | G01S 7/497 348/E3.018 |
| 6,678,039 | B2 * | 1/2004 | Charbon | ................ | H04N 25/65 342/135 |
| 6,690,354 | B2 * | 2/2004 | Sze | ......................... | G06F 3/017 345/173 |
| 6,710,770 | B2 * | 3/2004 | Tomasi | ................... | G06F 3/011 345/169 |

(Continued)

*Primary Examiner* — Bernarr E Gregory
(74) *Attorney, Agent, or Firm* — HONIGMAN LLP

(57) ABSTRACT

A vehicular sensing system includes a radar sensor including a radar module having a plurality of transmitters and a plurality of receivers. The radar module includes a plurality of facets, with each facet arranged at an obtuse angle relative to an adjacent facet and having a respective transmitter and a respective receiver disposed thereat. The respective transmitter and the respective receiver of each facet have a respective field of sensing and a respective principal sensing axis that is perpendicular to the respective facet. The vehicular sensing system, responsive to processing by the data processor of sensor data captured by the radar sensor, determines presence of a target object within a field of sensing of the radar sensor. Responsive to determining presence of the object, the vehicular sensing system controls a system of the vehicle based on the determined presence of the object.

23 Claims, 9 Drawing Sheets

(56) References Cited

U.S. PATENT DOCUMENTS

| | | | |
|---|---|---|---|
| 6,729,429 B2 | 5/2004 | Takahashi | |
| 6,876,775 B2* | 4/2005 | Torunoglu | H04N 23/81 |
| | | | 369/89 |
| 6,906,793 B2* | 6/2005 | Bamji | G01S 7/4914 |
| | | | 348/313 |
| 6,919,549 B2* | 7/2005 | Bamji | H04N 25/772 |
| | | | 250/214 R |
| 7,053,357 B2* | 5/2006 | Schwarte | G01S 7/4915 |
| | | | 250/214.1 |
| 7,157,685 B2* | 1/2007 | Bamji | H04N 25/772 |
| | | | 250/214 R |
| 7,176,438 B2* | 2/2007 | Bamji | H04N 25/617 |
| | | | 250/214 R |
| 7,203,356 B2* | 4/2007 | Gokturk | H04N 19/23 |
| | | | 375/E7.085 |
| 7,212,663 B2* | 5/2007 | Tomasi | G01B 11/25 |
| | | | 382/106 |
| 7,283,213 B2* | 10/2007 | O'Connor | G01C 3/08 |
| | | | 356/5.1 |
| 7,310,431 B2* | 12/2007 | Gokturk | G01B 11/2509 |
| | | | 382/103 |
| 7,321,111 B2* | 1/2008 | Bamji | H04N 25/57 |
| | | | 250/214 R |
| 7,340,077 B2* | 3/2008 | Gokturk | G06F 3/017 |
| | | | 348/208.14 |
| 7,352,454 B2* | 4/2008 | Bamji | G01S 17/36 |
| | | | 257/E27.048 |
| 7,375,803 B1* | 5/2008 | Bamji | H04N 5/2226 |
| | | | 356/4.01 |
| 7,379,100 B2* | 5/2008 | Gokturk | H04N 23/741 |
| | | | 348/229.1 |
| 7,379,163 B2* | 5/2008 | Rafii | G01C 3/08 |
| | | | 356/4.07 |
| 7,405,812 B1* | 7/2008 | Bamji | G01S 13/931 |
| | | | 356/5.1 |
| 7,408,627 B2* | 8/2008 | Bamji | G01S 7/497 |
| | | | 356/5.1 |
| 7,954,866 B2 | 6/2011 | Barcomb et al. | |
| 8,013,780 B2* | 9/2011 | Lynam | G01S 13/931 |
| | | | 342/55 |
| 8,027,029 B2* | 9/2011 | Lu | G01S 7/4817 |
| | | | 356/28 |
| 9,036,026 B2* | 5/2015 | Dellantoni | G01C 21/3602 |
| | | | 348/148 |
| 9,146,898 B2* | 9/2015 | Ihlenburg | B60W 10/18 |
| 9,575,160 B1* | 2/2017 | Davis | G01S 13/931 |
| 9,599,702 B1* | 3/2017 | Bordes | G01S 13/931 |
| 9,653,796 B2 | 5/2017 | Pleva | |
| 9,689,967 B1* | 6/2017 | Stark | G01S 13/931 |
| 9,753,121 B1* | 9/2017 | Davis | G01S 13/931 |
| 9,828,036 B2 | 11/2017 | Frayer et al. | |
| 9,869,762 B1* | 1/2018 | Alland | G01S 13/931 |
| 9,954,955 B2* | 4/2018 | Davis | G01S 13/931 |
| 9,963,085 B2 | 5/2018 | Smith et al. | |
| 10,239,446 B2 | 3/2019 | May et al. | |
| 10,534,081 B2 | 1/2020 | Wodrich | |
| 10,866,306 B2* | 12/2020 | Maher | G01S 13/931 |
| 2004/0085249 A1* | 5/2004 | Kitamori | G01S 13/931 |
| | | | 343/786 |
| 2010/0245066 A1* | 9/2010 | Sarioglu | G01S 7/003 |
| | | | 340/436 |
| 2014/0111370 A1 | 4/2014 | Aleem et al. | |
| 2016/0023598 A1* | 1/2016 | Kohler | G01S 13/931 |
| | | | 340/435 |
| 2017/0047649 A1* | 2/2017 | Himmelstoss | H01Q 13/06 |
| 2017/0222311 A1* | 8/2017 | Hess | G01S 13/931 |
| 2017/0254873 A1* | 9/2017 | Koravadi | G01S 3/14 |
| 2017/0276788 A1* | 9/2017 | Wodrich | G01S 13/931 |
| 2017/0315231 A1* | 11/2017 | Wodrich | G01S 13/931 |
| 2017/0356994 A1* | 12/2017 | Wodrich | G01S 13/931 |
| 2018/0015875 A1* | 1/2018 | May | G01S 13/931 |
| 2018/0045812 A1* | 2/2018 | Hess | G01S 13/931 |
| 2018/0231635 A1* | 8/2018 | Woehlte | G01S 13/931 |
| 2019/0339382 A1* | 11/2019 | Hess | G01S 13/931 |
| 2020/0249343 A1* | 8/2020 | Yu | G01S 13/931 |
| 2021/0373152 A1* | 12/2021 | Roh | G01S 13/931 |
| 2022/0201886 A1* | 6/2022 | Fuke | G01S 7/027 |

\* cited by examiner

VEHICULAR RADAR SENSOR WITH ANTENNA THAT PROVIDES IMPROVED BLIND-SPOT DETECTION

CROSS REFERENCE TO RELATED APPLICATION

The present application claims the filing benefits of U.S. provisional application Ser. No. 63/363,250, filed Apr. 20, 2022, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular sensing system includes a radar sensor disposed at a vehicle equipped with the vehicular sensing system. The radar sensor is operable to capture radar data. The radar sensor includes (i) a plurality of transmitters that transmit radio signals and (ii) a plurality of receivers that receive radio signals. The system includes an electronic control unit (ECU) with electronic circuitry and associated software. The electronic circuitry of the ECU includes a data processor for processing radar data captured by the radar sensor. The radar sensor includes a plurality of facets, and wherein an outboard surface of each facet of the plurality of facets is arranged at an obtuse angle relative to an adjacent facet of the plurality of facets, and wherein each facet of the plurality of facets has (i) a respective transmitter of the plurality of transmitters disposed thereat and (ii) a respective receiver of the plurality of receivers disposed thereat. The respective transmitter and the respective receiver of each facet of the plurality of facets has a respective field of sensing and a respective principal sensing axis and each respective principal sensing axis is perpendicular to the respective facet. The respective field of sensing of the respective transmitter and the respective receiver of one of the facets at least partially overlaps the respective field of sensing of the respective transmitter and the respective receiver of another facet adjacent to the one of the facets. The vehicular sensing system, responsive to processing by the data processor of sensor data captured by the radar sensor, determines presence of an object within at least one respective field of sensing of the radar sensor. The vehicular sensing system, responsive to determining presence of the object, controls a system of the vehicle based on the determined presence of the object.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
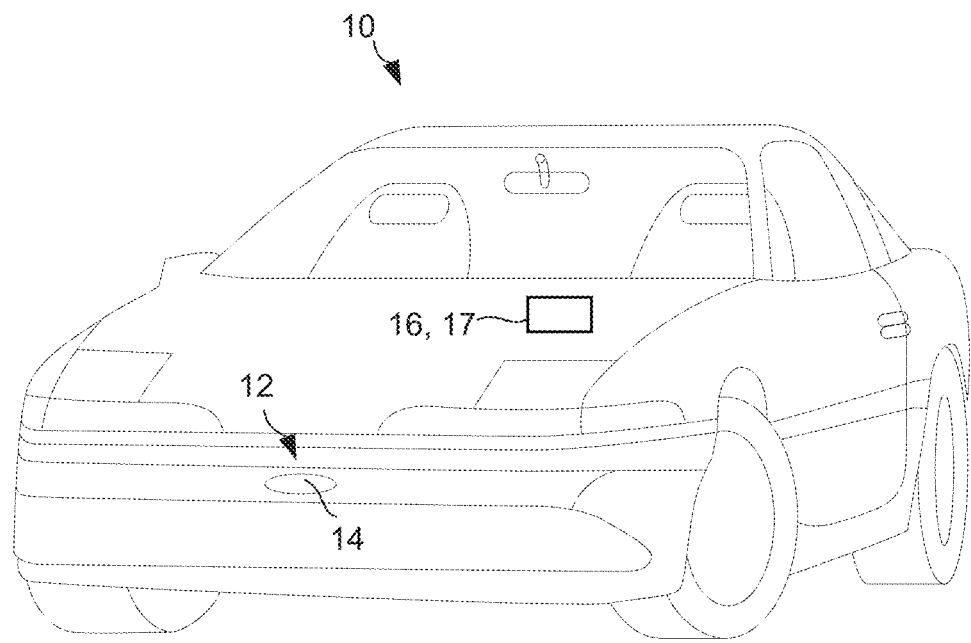
FIG. 1 is a perspective view of a vehicle with a sensing system that incorporates a radar sensor.

Referring now to the drawings and the illustrative embodiments depicted therein, a vehicle 10 (FIG. 1) includes a driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) 16 that includes a data processor 17 that is operable to process data captured by the radar sensor(s). The sensing system may also include a radar sensor that includes a plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controls at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Figure 2:
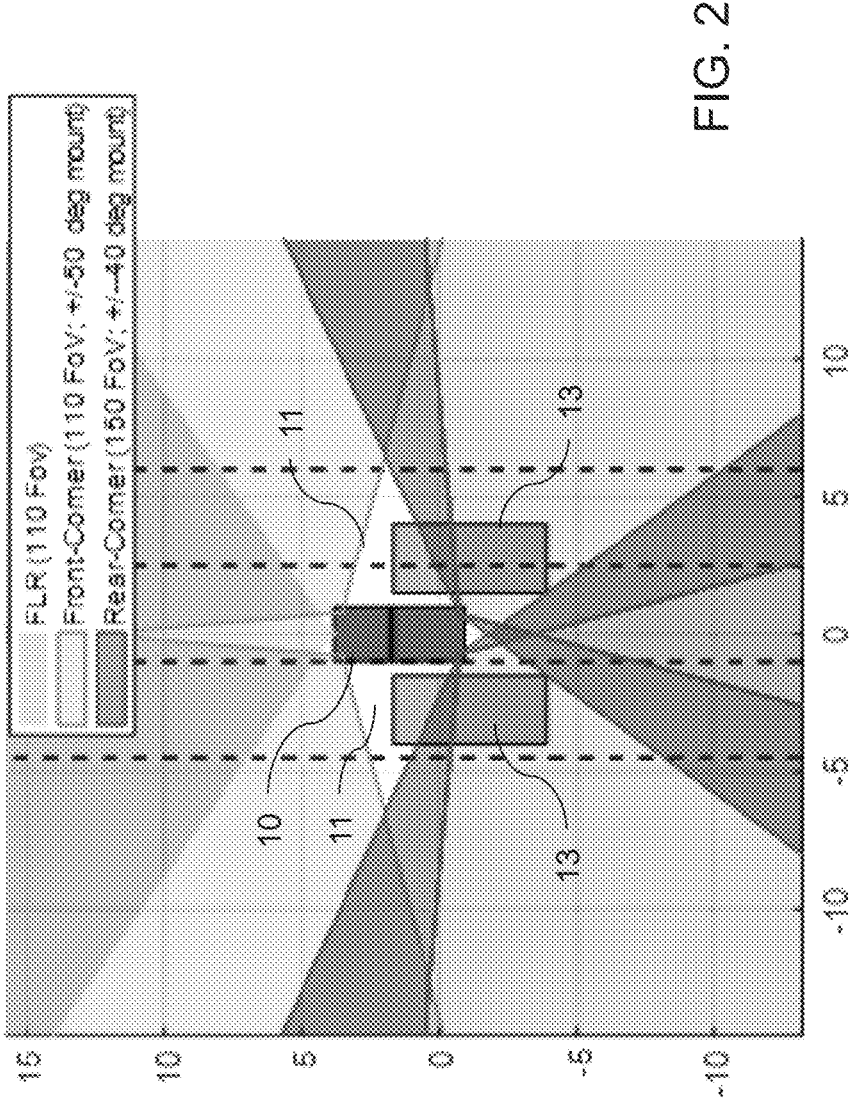
FIGS. 2-5 are schematic views of a vehicle equipped with existing radar sensors and blind-spots along the sides of the vehicle.
Figure 4:
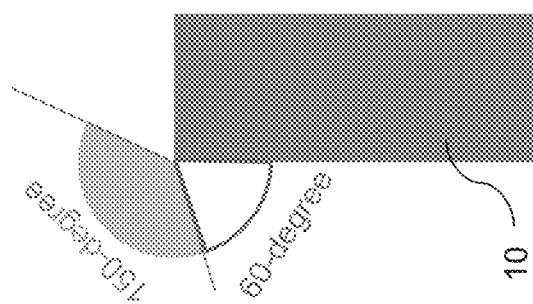
Figure 3:
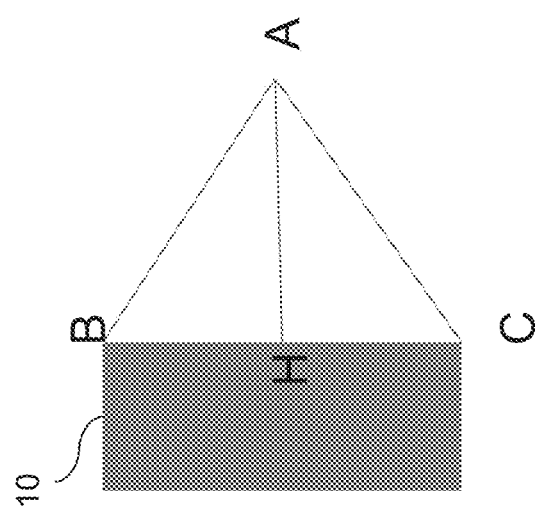
Figure 5:
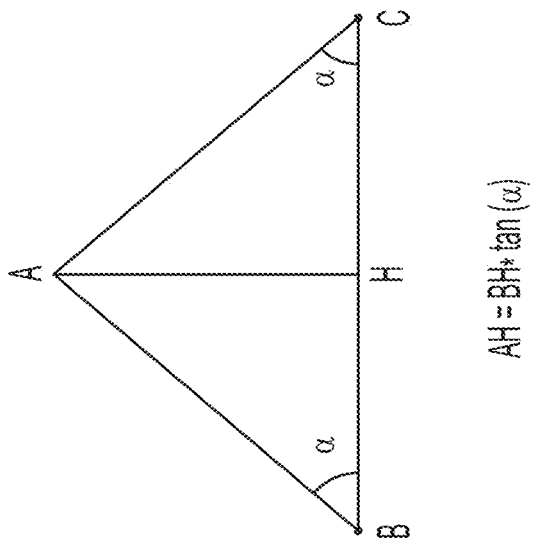

FIG. 2 depicts a schematic view of a vehicle 10 equipped with a conventional sensing system with traditional radar sensor units disposed at each of the four corner regions of the vehicle 10. As shown, the traditional front-corner (i.e., front driver-side and front passenger-side) radar sensor units each have a field of sensing of about 110 degrees about the respective sensor units and the traditional rear-corner radar sensor units each have a field of sensing of about 150 degrees about the respective sensor unit. This results in large blind-spots 11 (i.e., areas outside of or not included within the fields of sensing of any of the radar sensors) on either side of the vehicle where the sensing system is unable to view or sense or detect objects 13. For example, FIGS. 3 and 4 illustrate that, even when the field of sensing of both the front passenger-side radar sensor unit B and the rear passenger-side radar sensor unit C are 150 degrees, each radar sensor unit has a blind-spot measured from the side of the vehicle 10 of 60 degrees. When the distance between the radar sensor unit B and the radar sensor unit C is 5 meters (i.e., about the length of the vehicle), a blind-spot may extend to a point A from the side of the vehicle of approximately 4.3 meters (FIG. 5). In other words, the system may be unable to sense an object at the side of the vehicle that is closer to the vehicle than 4.3 meters (i.e., in the blind spots of the radar sensor unit B and the radar sensor unit C).

Thus, automotive mid-range radar sensors are generally integrated at front-corner and rear-corner positions of the vehicle to sense the near-by environment. The field of sensing is often defined as the region where the antenna gain patterns are within a level of threshold. In the direction where the gain patterns drop below this value (i.e., out of the field of sensing), the received signal will be below the threshold that the radar can distinguish between objects and random noise. Thus, the areas between radar sensors often define large blind-spots for the sensing system due to the limited field of sensing of the radar, which is constrained by the design of the antenna and the integration of the radar, causing a blind-spot area at least close to both sides of the car. For example, a radar antenna having a large field of sensing (such as 150 degrees or ±70 degrees on either side of the antenna face) may result in a 60 degree blind-spot along the side of the vehicle. Thus, the blind-spot area between radar units positioned at the front and rear corners of a vehicle may result in a blind-spot area of up to 4.3 meters or larger.

Large blind-spots create issues for the driver of the vehicle and/or for advanced driver assist systems (ADAS) of the vehicle because the sensing system may be unable to detect or track objects that are close to the vehicle (i.e., within the blind spot). For example, the blind-spot may limit the ADAS system in detecting a target (e.g., an obstacle or another vehicle or pedestrian within a blind spot (e.g., just next to the car)). This will be critical, especially when the vehicle is planning to perform a take-over (i.e., passing and moving in front of another vehicle), perform a lane-change, or other higher risk maneuvers. For an ADAS capable of performing automatic lane-changes, this would be an important issue as the system may not be aware of the target (e.g., another vehicle or pedestrian or bicycle) next to the equipped vehicle.

As shown in FIGS. 6-11, one or more radar sensor units 14 of the sensing system 12 equipped at the vehicle 10 includes a multi-faceted or multi-surfaced antenna unit or radar module 18 to provide a wider or greater field of view or sensing for the radar sensor unit. In other words, each radar sensor unit 14 includes a printed circuit board (PCB) 20 (FIG. 11) and an antenna module 18 (FIGS. 6-11) attached at the PCB 20 that includes multiple radiating elements (i.e., receivers and transmitters) having different fields of sensing originating from the radar sensor unit 14. The antenna module 18 directs the radar signals transmitted by the radar sensor to the environment and receives radar signals reflected from objects in the environment. The antenna module 18 includes two or more (such as three or more) facets or surfaces where each facet includes respective radiating elements for transmitting and receiving the radar signals. The radiating elements enable a field of sensing for each facet of about 150 degrees and the facets of the antenna module 18 are each arranged at an obtuse angle relative to the adjacent facet to increase the total or combined field of sensing of the radar sensor unit 14, such as to be greater than 150 degrees. Thus, the antenna module allows a single, flat PCB of a single radar module 14 to transmit and receive radar signals in a field of sensing greater than 150 degrees to reduce or eliminate a blind-spot region of the vehicle sensing system 12.

Thus, the sensing system includes an antenna design as part of the system, which functions to send radio signals to the external environment and to receive the reflected signals returned after encountering objects in the environment. Each antenna has radiating elements on different facets or faces or surfaces of the antenna that can send or receive signals together or separately. Thus, the combination of the fields of sensing of all the radiating elements allows the radar to have a much wider field of sensing compared to conventional corner radar sensing units. In contrast, the radiating element of traditional radar antennas, even spatially distributed, are only on a 2D surface or facet (i.e., on the same plane). Thus, the radar field of sensing is limited by the radiating element, which leads to the blind-spot issue. The current antenna design addresses this issue by combining the fields of sensing of different radiating elements on different surfaces (i.e., each surface is on a different planes), thus virtually enlarging the field of sensing of the radar sensor and greatly reducing the blind-spot region. The multi-faceted antenna enables the radar to sense in a much wider region (e.g., greater than 150 degrees), protecting small traffic participants, such as a pedestrian or bicycle or scooter from being within the blind-spot of the radar. The antenna can be integrated directly with other components such as the PCB and the housing of the radar system.

Figure 8:
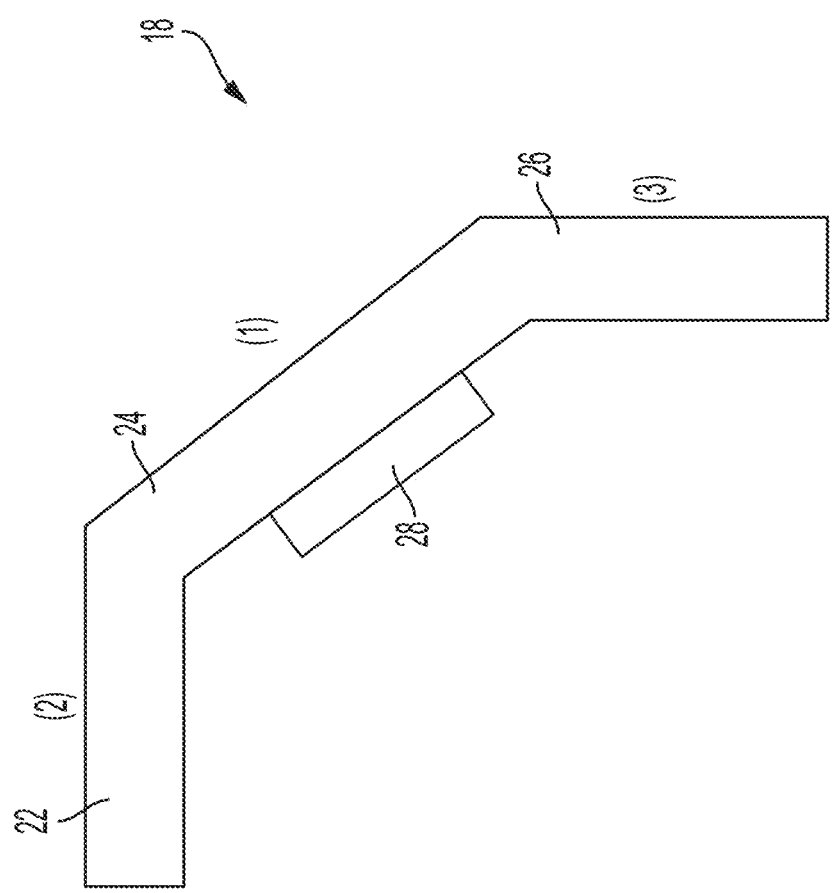
FIG. 8 is a top view of the multifaceted radar module.
Figure 9:
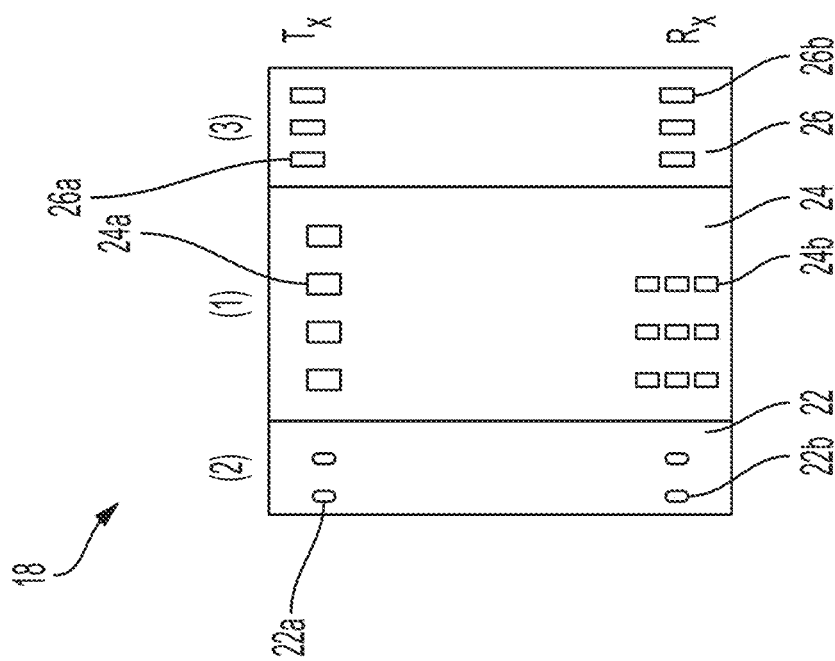
FIG. 9 is a front view of the multifaceted radar module.

For example, in the illustrated embodiment of FIG. 8, the radar sensor 14 includes a first facet/face or surface 22, a second facet or surface 24 and a third facet or surface 26 where the first facet 22 and the third facet 26 are disposed on opposing sides of the second facet 24 and at respective obtuse angles relative to the second facet 24. For example, the respective obtuse angle between the outboard surfaces of the first facet 22 and the second facet 24 or the second facet 24 and the third facet 26 is approximately 225 degrees. As shown in FIG. 9, the front or outboard surface of the first facet 22 (i.e., the surface facing outward from the vehicle toward the environment) includes first transmitting radiating elements 22a (i.e., transmitters) for transmitting or directing or guiding radar signals transmitted from the radar sensor (i.e., from the PCB) and first receiving radiating elements 22b (i.e., receivers) for receiving or directing or guiding radar signals reflected from objects in the environment to the radar sensor (i.e., to the PCB). Similarly, the second facet 24 includes second transmitting radiating elements 24a and second receiving radiating elements 24b, and the third facet 26 includes third transmitting radiating elements 26a and third receiving radiating elements 26b. The radiating elements may be in any quantity and disposed in any suitable shape to achieve different shapes and ranges for the field of sensing of the radar sensor unit.

The radiating elements on the different surfaces/facets of the antenna can send the transmitting radio signal to the environment in different directions relative to the elements on the other facets, where the field of sensing of the respective radiating element is determined with respect to the normal vector (i.e., perpendicular to the surface or facet). Since these surfaces are facing different directions (i.e., have different normal vectors), the fields of sensing of the radiating elements on the respective surfaces are different. The fields of sensing for elements on different facets may at least partially overlap and also complement each other. The different fields of sensing of these radiating elements allow the radar to send and receive signals in different directions simultaneously. In other words, the radar can sense the environment around it in a much broader field of sensing (as a combination of the fields of sensing of the individual radiating elements) compared to conventional radar with radiating elements disposed in only two dimensions. Moreover, the radar sensor unit may be disposed or deployed at a corner of the vehicle, allowing the different facets to "wraparound" the vehicle to some extent to leverage the greater field of sensing. This may allow a single radar sensor unit to achieve a field of sensing greater than 180 degrees. The combined field of sensing will significantly reduce the blind-spot region, where the radar cannot receive the reflected back signal.

Figure 6:
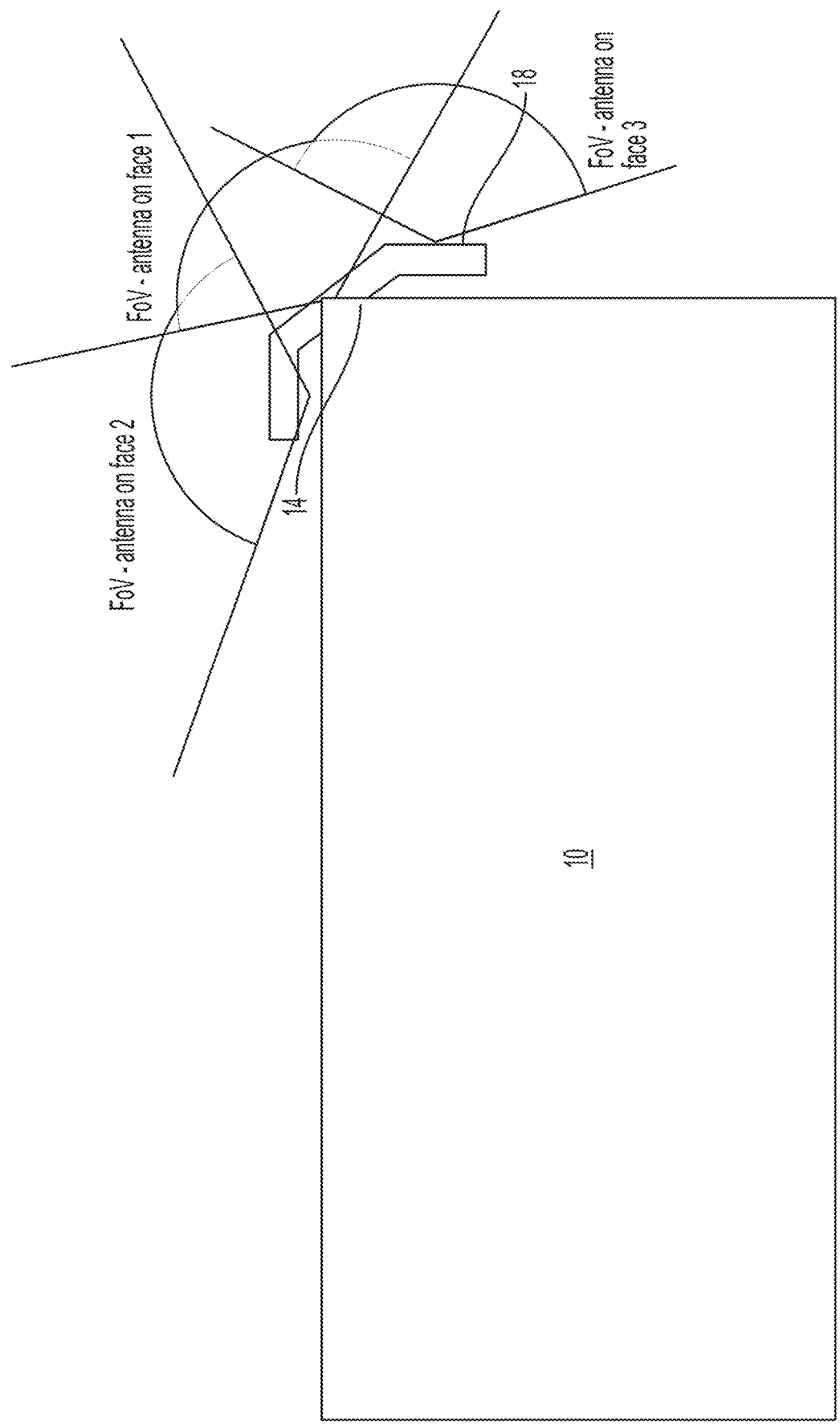
FIGS. 6 and 7 are schematic views of a vehicle equipped with a radar sensor having a multifaceted radar module.
Figure 7:
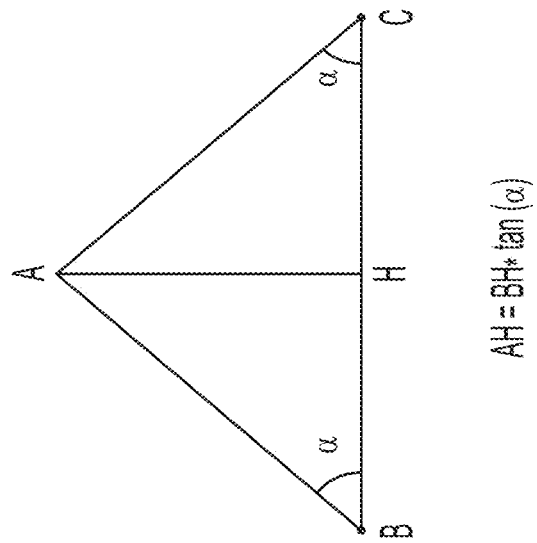

As shown in FIGS. 6 and 7, the antenna module 18 is configured so that the overlapping fields of sensing provided by the multiple facets may be about 240 degrees relative to the position of the radar sensor 14 at the vehicle 10. Thus, an angle between the side of the vehicle 10 and the edge of the combined field of sensing is only about 15 degrees, which results in a furthest blind-spot point (in this example) of only about 0.66 meters. In other words, the sensing system 12 equipped with the radar sensors 14 having the multifaceted antenna module 18 may, in some examples, detect objects as close as 0.66 meters or closer from the vehicle. Optionally, the antenna module 18 may be configured to have a combined field of sensing with other modules 18 that fully senses around the vehicle (such that each module has a 270 degree or larger field of sensing) to entirely eliminate any blind-spot of the visions system.

Figure 10:
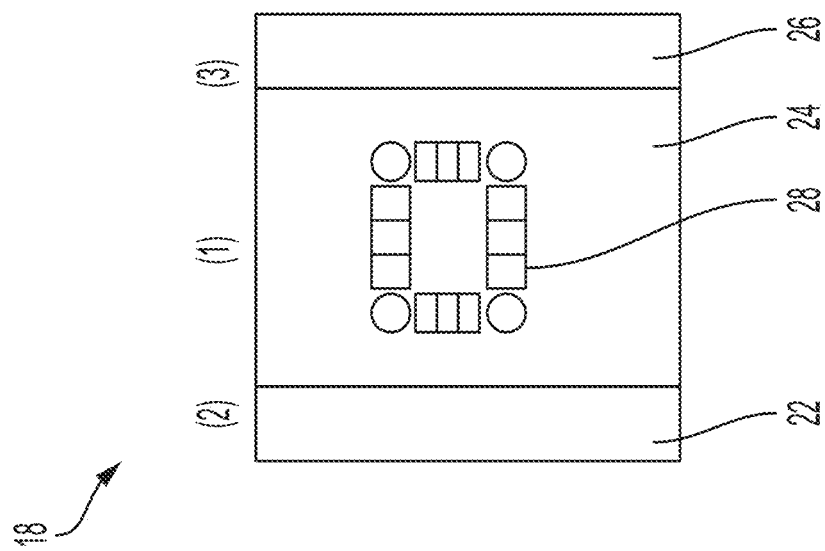
FIG. 10 is a rear view of the multifaceted radar module.

As shown in FIGS. 8 and 10, wave guide coupling ports 28 may be disposed on a rear surface of the antenna module 18 (i.e., the inboard surface or surface that faces toward the vehicle) for attaching/mounting the antenna module 18 at the PCB 20. The wave guide coupling ports may be located on a single planar rear surface of the antenna module 18 (such as the rear surface of the second facet 24) to enable connection between the antenna module 18 and a flat (i.e., a single plane) PCB 20. The PCB as such may be disposed parallel to the facet the PCB is mounted with. The shape and distribution of the wave guide coupling ports 28 may be optimized to maximize the power coupled to the radiating elements on the front surface of the antenna module 18. Thus, the wave guide coupling ports 28 provide places where the power is coupled from the PCB 20 to the antenna module 18 via coupling structure of the PCB 20.

In other words, while the radiating elements may be distributed on several surfaces (e.g., 2 or 3 or more) of the antenna module, and the excitation for these elements are routed to a main surface on the back of the antenna module (i.e., toward the vehicle) to the waveguide coupling ports. The location of the waveguide coupling ports allows the antenna to be integrated with a single planar or flat printed circuit board (PCB), where the main electronics and radar system are located.

Figure 11:
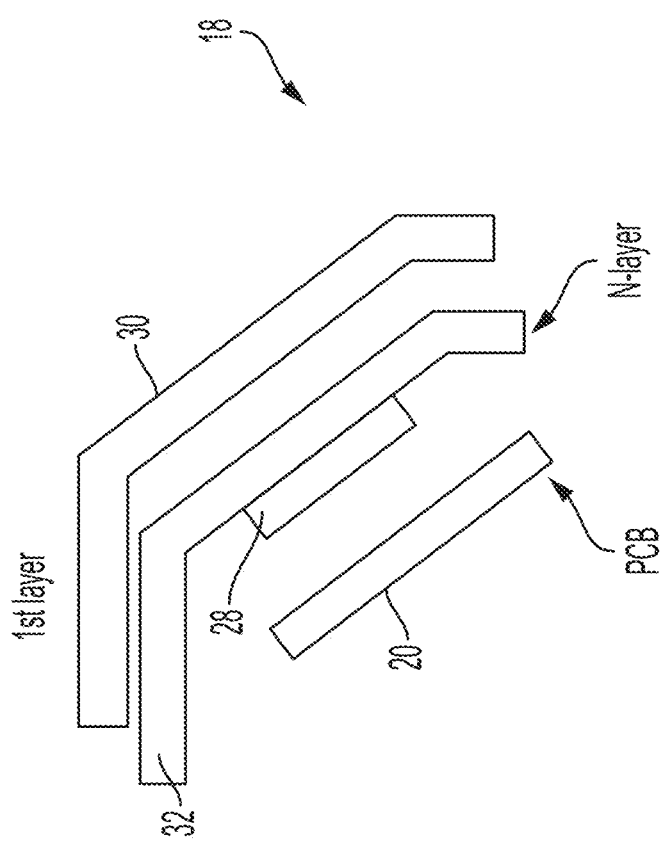
FIG. 11 is an exploded view of the radar sensor and multifaceted radar module.

As shown in FIG. 11, the antenna module 18 may comprise a multilayered construction where an outermost layer 30 (i.e., the outboard layer) includes the radiating elements of the different facets of the antenna module 18 and an innermost layer 32 (i.e., the inboard layer) includes the waveguide coupling ports 28 for attaching the antenna module 18 at the PCB 20. Any number of layers may be disposed between the outermost layer 30 and the innermost layer 32 to provide a medium for connecting the waveguide coupling ports 28 to the radiating elements at the front surface of the antenna module 18. Each layer may include a three dimensional (3D) printed material (or other suitable plastic or polymer) having a metallic coating disposed thereat and the layers may be attached or connected to one another in any suitable manner, such as via an adhesive or via mechanical means (such as threaded fasteners), or the like.

The proposed antenna design may be realized by cascading multiple layers of metallic or metallic-coated layers, where the first layer consists of the radiating elements on different surfaces. The last layer (i.e., the innermost layer) may host the wave guide coupling port, where the interface between the antenna module and the main PCB takes place. The middle or intermediate layers can be used for routing from the radiating element in the first layer to the wave guide coupling port in the last layer on the back of the antenna module (e.g., via waveguides, circuit traces, etc.). Each layer can be realized using (but not limited to) injection molding technology, with the plastic piece being metallic coated later on. The integration of the antenna to the main PCB is done via the waveguide coupling ports at the back of the antenna module. The interface between the antenna modules and the main PCB is via the waveguide coupling ports concentrated on one surface, thus making it possible to connect the antenna with a single flat (i.e., planar) PCB only.

Thus, the vehicle sensing system includes one or more radar sensor units each having multiple (e.g., three) faces or facets or surfaces with antennas positioned on each face and each antenna having a greater than 90 degree (e.g., a 150 degree) field of sensing. Each radar sensor unit may be positioned at or near a corner of a vehicle (e.g., at the corners of the front and/or rear bumpers of the vehicle). The system may include any number of radar sensors, such as one to four radar sensors (i.e., one at each corner of the vehicle). The system reduces or eliminates blind-spots present when using conventional radar systems. For example, blind-spot regions may be reduced to less than 1 meter from the vehicle, which is often the required distance from vehicle to the other object or vehicle (e.g., bicycle/scooter or pedestrian). The radar sensor may include a 3D antenna design concept with multiple facets/surfaces with each facet oriented along a different plane relative to the vehicle, where the antenna radiating elements are located on each surface. Each facet contains several radiating elements for both transmitting and receiving the radio signals. These surfaces do not have the same normal vector, such that the facets are facing different directions (i.e., on different planes). This allows the antenna elements on each surface to have different fields of sensing relative to the antenna elements on each other surface of the radar sensor unit. The radar sensors may enable detection of objects around the vehicle for any number of vehicle systems or features, such as for one or more advanced driver assistance systems (e.g., an automatic emergency braking system, an automatic cruise control system, a blind spot monitoring system, etc.).

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039;

6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
   a radar sensor disposed at a vehicle equipped with the vehicular sensing system, wherein the radar sensor is operable to capture radar data;
   wherein the radar sensor comprises (i) a plurality of transmitters that transmit radio signals and (ii) a plurality of receivers that receive radio signals;
   an electronic control unit (ECU) comprising electronic circuitry and associated software;
   wherein the electronic circuitry of the ECU comprises a data processor for processing radar data captured by the radar sensor;
   wherein the radar sensor comprises a plurality of facets, and wherein an outboard surface of each facet of the plurality of facets is arranged at an obtuse angle relative to an adjacent facet of the plurality of facets, and wherein each facet of the plurality of facets has (i) a respective transmitter of the plurality of transmitters disposed thereat and (ii) a respective receiver of the plurality of receivers disposed thereat;
   wherein the respective transmitter and the respective receiver of each facet of the plurality of facets has a respective field of sensing and a respective principal sensing axis, and wherein each respective principal sensing axis is perpendicular to the respective facet;
   wherein the respective field of sensing of the respective transmitter and the respective receiver of one of the facets at least partially overlaps the respective field of sensing of the respective transmitter and the respective receiver of another facet adjacent to the one of the facets;
   wherein the vehicular sensing system, responsive to processing by the data processor of sensor data captured by the radar sensor, determines presence of an object within at least one respective field of sensing of the radar sensor; and
   wherein the vehicular sensing system, responsive to determining presence of the object, controls a system of the vehicle based on the determined presence of the object.

2. The vehicular sensing system of claim 1, wherein the plurality of facets comprise a (i) first facet, (ii) a second facet, and (iii) a third facet, and wherein the first facet and the third facet are disposed on opposing sides of the second facet and arranged at respective obtuse angles relative to the second facet.

3. The vehicular sensing system of claim 1, wherein each transmitter directs the transmitted radio signals from the radar sensor to the environment and each receiver receives radio signals from the environment.

4. The vehicular sensing system of claim 1, wherein each respective facet comprises a respective plurality of transmitters and a respective plurality of receivers disposed thereat.

5. The vehicular sensing system of claim 1, wherein the radar sensor comprises a printed circuit board (PCB), and wherein the radar sensor comprises a wave guide coupling port at a inboard surface of one of the facets, and wherein the wave guide coupling port couples radio signals between the plurality of facets and the PCB.

6. The vehicular sensing system of claim 1, wherein the radar sensor is disposed at a corner region of the vehicle.

7. The vehicular sensing system of claim 6, wherein the vehicular sensing system comprises a plurality of radar sensors and each radar sensor of the plurality of radar sensors is disposed at a respective corner region of the vehicle.

8. The vehicular sensing system of claim 6, wherein the corner region of the vehicle comprises a corner of a bumper of the vehicle.

9. The vehicular sensing system of claim 1, wherein a combined field of sensing of each respective field of sensing is greater than 150 degrees.

10. The vehicular sensing system of claim 9, wherein the combined field of sensing is at least 240 degrees.

11. The vehicular sensing system of claim 1, wherein each facet comprises a plurality of layers, and wherein the plurality of layers comprises an outer layer, an inner layer, and at least one intermediate layer.

12. The vehicular sensing system of claim 11, wherein the at least one intermediate layer routes radio signals from the inner layer to the outer layer, and wherein the at least one intermediate layer routes radio signals from the outer layer to the inner layer.

13. The vehicular sensing system of claim 1, wherein the radar sensor comprises a planar printed circuit board (PCB), and wherein the plurality of facets comprises three facets, and wherein only one facet of the three facets is mounted to the planar PCB.

14. A vehicular sensing system, the vehicular sensing system comprising:
   a plurality of radar sensors disposed at a vehicle equipped with the vehicular sensing system, wherein each radar sensor of the plurality of radar sensors is operable to capture radar data;
   wherein each radar sensor of the plurality of radar sensors is disposed at a respective corner region of the vehicle;
   wherein each radar sensor of the plurality of radar sensors comprises (i) a plurality of transmitters that transmit radio signals and (ii) a plurality of receivers that receive radio signals;
   an electronic control unit (ECU) comprising electronic circuitry and associated software;
   wherein the electronic circuitry of the ECU comprises a data processor for processing radar data captured by each radar sensor of the plurality of radar sensors;

wherein each radar sensor of the plurality of radar sensors comprises a plurality of facets, and wherein the plurality of facets comprises at least three facets, and wherein an outboard surface of each facet of the plurality of facets is arranged at an obtuse angle relative to an adjacent facet of the plurality of facets, and wherein each facet of the plurality of facets has (i) a respective transmitter of the plurality of transmitters disposed thereat and (ii) a respective receiver of the plurality of receivers disposed thereat;

wherein the respective transmitter and the respective receiver of each facet of the plurality of facets has a respective field of sensing and a respective principal sensing axis, and wherein each respective principal sensing axis is perpendicular to the respective facet;

wherein the respective field of sensing of the respective transmitter and the respective receiver of one of the facets at least partially overlaps the respective field of sensing of the respective transmitter and the respective receiver of another facet adjacent to the one of the facets;

wherein the vehicular sensing system, responsive to processing by the data processor of sensor data captured by at least one radar sensor of the plurality of radar sensors, determines presence of an object within the respective field of sensing of the at least one radar sensor; and wherein the vehicular sensing system, responsive to determining presence of the object, controls a system of the vehicle based on the determined presence of the object.

15. The vehicular sensing system of claim 14, wherein the plurality of facets comprise a (i) first facet, (ii) a second facet, and (iii) a third facet, and wherein the first facet and the third facet are disposed on opposing sides of the second facet and arranged at respective obtuse angles relative to the second facet.

16. The vehicular sensing system of claim 14, wherein each transmitter directs the transmitted radio signals from a respective radar sensor of the plurality of radar sensors to the environment and each receiver receives radio signals from the environment.

17. The vehicular sensing system of claim 14, wherein each respective facet comprises a respective plurality of transmitters and a respective plurality of receivers disposed thereat.

18. The vehicular sensing system of claim 14, wherein each radar sensor of the plurality of radar sensors comprises a printed circuit board (PCB), and wherein each radar sensor of the plurality of radar sensors comprises a wave guide coupling port at a inboard surface of one of the facets, and wherein the wave guide coupling port couples radio signals between the plurality of facets and the PCB.

19. A vehicular sensing system, the vehicular sensing system comprising:

a radar sensor disposed at a vehicle equipped with the vehicular sensing system, wherein the radar sensor is operable to capture radar data;

wherein the radar sensor comprises (i) a plurality of transmitters that transmit radio signals and (ii) a plurality of receivers that receive radio signals;

an electronic control unit (ECU) comprising electronic circuitry and associated software;

wherein the electronic circuitry of the ECU comprises a data processor for processing radar data captured by the radar sensor;

wherein the radar sensor comprises a plurality of facets, and wherein an outboard surface of each facet of the plurality of facets is arranged at an obtuse angle relative to an adjacent facet of the plurality of facets, and wherein each facet of the plurality of facets has (i) a respective transmitter of the plurality of transmitters disposed thereat and (ii) a respective receiver of the plurality of receivers disposed thereat;

wherein each facet comprises a plurality of layers, and wherein the plurality of layers comprises an outer layer, an inner layer, and at least one intermediate layer;

wherein the respective transmitter and the respective receiver of each facet of the plurality of facets has a respective field of sensing and a respective principal sensing axis, and wherein each respective principal sensing axis is perpendicular to the respective facet;

wherein the respective field of sensing of the respective transmitter and the respective receiver of one of the facets at least partially overlaps the respective field of sensing of the respective transmitter and the respective receiver of another facet adjacent to the one of the facets;

wherein the radar sensor comprises a planar printed circuit board (PCB), and wherein the plurality of facets comprises three facets, and wherein only one facet of the three facets is mounted to the planar PCB;

wherein the vehicular sensing system, responsive to processing by the data processor of sensor data captured by the radar sensor, determines presence of an object within at least one respective field of sensing of the radar sensor; and wherein the vehicular sensing system, responsive to determining presence of the object, controls a system of the vehicle based on the determined presence of the object.

20. The vehicular sensing system of claim 19, wherein the at least one intermediate layer routes radio signals from the inner layer to the outer layer, and wherein the at least one intermediate layer routes radio signals from the outer layer to the inner layer.

21. The vehicular sensing system of claim 19, wherein a combined field of sensing of each respective field of sensing is greater than 150 degrees.

22. The vehicular sensing system of claim 21, wherein the combined field of sensing is at least 240 degrees.

23. The vehicular sensing system of claim 19, wherein the one facet of the three facets is parallel to a planar surface of the planar PCB.

* * * * *